(12) United States Patent
Urbahns (10) Patent No.: US 8,825,014 B2
(45) Date of Patent: Sep. 2, 2014

(54) APPARATUS, AND AN ASSOCIATED METHODOLOGY, FOR PROVIDING REPEAT NOTIFICATION AT A RADIO COMMUNICATION DEVICE

(75) Inventor: Rex A. Urbahns, Birmingham, AL (US)

(73) Assignee: QUALCOMM Incorporated, San Diego, CA (US)

( * ) Notice: Subject to any disclaimer, the term of this patent is extended or adjusted under 35 U.S.C. 154(b) by 1472 days.

(21) Appl. No.: 12/026,136

(22) Filed: Feb. 5, 2008

(65) Prior Publication Data

US 2009/0075632 A1 Mar. 19, 2009

Related U.S. Application Data

(60) Provisional application No. 60/972,286, filed on Sep. 14, 2007.

(51) Int. Cl.
*H04M 1/725* (2006.01)
*H04M 19/04* (2006.01)

(52) U.S. Cl.
CPC .......... *H04M 1/72547* (2013.01); *H04M 19/04* (2013.01); *H04M 1/72566* (2013.01)
USPC .......................... 455/412.2; 455/415; 455/418

(58) Field of Classification Search
CPC ....................... H04W 52/0251; H04W 52/0261
USPC ............................. 455/412.1, 412.2, 415, 418
See application file for complete search history.

(56) References Cited

U.S. PATENT DOCUMENTS

| | | | | |
|---|---|---|---|---|
| 5,388,150 A * | 2/1995 | Schneyer et al. | .......... | 379/88.19 |
| 5,862,470 A * | 1/1999 | Damghani | .................... | 455/418 |
| 5,966,655 A * | 10/1999 | Hardouin | ...................... | 455/418 |
| 6,484,033 B2 * | 11/2002 | Murray | ...................... | 455/456.3 |
| 6,574,471 B1 * | 6/2003 | Rydbeck | ....................... | 455/418 |
| 7,092,743 B2 * | 8/2006 | Vegh | ............................. | 455/567 |
| 2003/0083051 A1 * | 5/2003 | Ntende | ......................... | 455/414 |
| 2003/0220098 A1 * | 11/2003 | Gruchala et al. | .......... | 455/414.1 |
| 2004/0097218 A1 * | 5/2004 | Vossler | ......................... | 455/418 |
| 2004/0198427 A1 * | 10/2004 | Kimbell et al. | ............ | 455/556.1 |
| 2006/0116116 A1 * | 6/2006 | Slemmer et al. | ............. | 455/418 |
| 2006/0240803 A1 * | 10/2006 | Valeriano et al. | .......... | 455/412.1 |
| 2006/0248147 A1 * | 11/2006 | Hill et al. | ...................... | 709/206 |
| 2007/0014280 A1 * | 1/2007 | Cormier et al. | ............... | 370/352 |
| 2007/0021108 A1 * | 1/2007 | Bocking et al. | ............ | 455/414.1 |
| 2007/0057775 A1 * | 3/2007 | O'Reilly et al. | .............. | 340/309 |
| 2008/0119710 A1 * | 5/2008 | Reggiardo et al. | ............ | 600/365 |
| 2008/0201174 A1 * | 8/2008 | Ramasubramanian et al. | .. | 705/3 |
| 2008/0270761 A1 * | 10/2008 | Rasmussen et al. | .......... | 712/209 |
| 2008/0293392 A1 * | 11/2008 | Strother | ..................... | 455/414.2 |

FOREIGN PATENT DOCUMENTS

EP        1365564 A1        11/2003

* cited by examiner

*Primary Examiner* — Jinsong Hu
*Assistant Examiner* — Qun Shen
(74) *Attorney, Agent, or Firm* — Fulbright & Jaworski LLP (57) ABSTRACT

An apparatus, and an associated methodology, for alerting a user of a radio device of delivery thereto of a text, or other, message. The alert of the received message is made according to a selected schedule and settings and includes a repeat notification. A user selects schedules and settings that define the manner by which the received message is to be annunciated. The user enters the selections by way of a touch screen interface. Determination is made, upon detection, by detector of a received message in what manner to make notification of the message.

19 Claims, 5 Drawing Sheets

APPARATUS, AND AN ASSOCIATED METHODOLOGY, FOR PROVIDING REPEAT NOTIFICATION AT A RADIO COMMUNICATION DEVICE

CROSS-REFERENCE TO RELATED APPLICATION

The present invention claims the priority of provisional patent application Ser. No. 60/972,286, filed on Sep. 14, 2007, the contents of which are incorporated herein by reference.

The present invention relates generally to a portable radio device, such as a Windows™ implemented mobile device, capable of receiving text messages, or other terminating communications. More particularly, the present invention relates to an apparatus and an associated methodology, by which to alert a user of a received communication. The user controls the manner by which the alert is made. An alert is selectably repeated and provided in a selected combination of audio, visual, or vibratory alerts.

BACKGROUND OF THE INVENTION

Advancements in communication technologies have provided the basis for the development and deployment of new types of radio communication systems. A cellular communication system is exemplary of a radio communication system that has been widely deployed and whose use through which to communicate is widespread.

While early-generation, cellular communication systems provided primarily for voice communication services, newer-generation systems increasingly provide for data communication services. For many, telephonic communications by way of a cellular, or cellular-like, communication system is a regular occurrence, and, for some, use of a cellular communication system through which to communicate is a predominant manner by which to telephonically communicate.

Increasingly, use is made of cellular, or cellular-like communication systems to communicate messages pursuant to the message-service capabilities of such systems. Message services include, for instance, e-mail communications. E-mail communications include text messages and data amenable for communication in digital form. Communications by way of messaging services are sometimes preferred for the reason that a recipient of a message need not immediately access the message but, rather, the recipient is able later to retrieve the communicated message. Additionally, unlike voice communications, text-based communications are not ephemeral, and a record is maintained of the communication.

The recipient of the message must, of course, be aware of the delivery of the message in order for the recipient to view the message and to take further action, if needed. Some communication devices that are used for messaging services do not provide an appropriate range of alerts to provide best for alerting of a recipient of the received message. When a communication is urgent, communication that otherwise would be carried out pursuant to a message service is sometimes instead carried out by a voice service. The sender is better assured that the informational content of the communication is timely delivered to the recipient.

This problem would be less likely to occur if the radio communication device provided for better alerts, better permitting a user thereof to detect delivery of a terminating message.

Field service workers, for instance, sometimes utilize handheld, wireless communication devices that are text-message capable. The field service worker, for instance, receives, by way of text messages, instructions from a home, or other remote, office. The instructions may, for instance, comprise operational edicts, operational advice, or merely reports or other information related to the home, or other, office or general information. Other messages might also be deliverable to the communication device. And some of these other messages might also be urgent. Of whatever origin, the message if important, should be timely viewed by the field service worker. The annunciation of the reception of the message should, therefore, be made in a manner in which the field service worker is likely to detect its delivery.

If, for instance, the wireless communication device comprises a Windows™-based generally fails to provide a manner by which properly to alert a user of reception of an urgent message. For instance, such devices fail to provide for repeat notification of a received message. If the user of the device is unable immediately to view a received message, the received message might be forgotten and not timely reviewed.

An improved manner by which to alert a recipient of a received message is therefore needed.

It is in light of this background information related to radio communication systems that the significant improvements of the present invention have evolved.

SUMMARY OF THE INVENTION

The present invention, accordingly, advantageously provides, an apparatus and an associated message, for a portable radio device, such as a Windows™ implemented mobile device, capable of receiving text messages, or other terminating communications.

Through operation of an embodiment of the present invention, a manner is provided by which to alert a user of a received communication. The manner by which the alert is made is selectable, and the alert provides for repeat notification in any of, or any combination of, audio, visual, and vibratory alerts.

In one aspect of the present invention, a user interface is provided by which to enter schedule information. The schedule information defines a schedule and associated annunciation rules that are used to generate annunciations that alert a user of a radio device of the delivery of a message. The schedule is provided, for instance, on a day of week and time of day basis. When using a schedule that identifies annunciation schemes depending upon the day and time, the manner by which the notification is made is correspondingly based upon the day and time at which the message is received.

In another aspect of the present invention, the user interface includes a display screen at which a schedule template is displayed. The display screen is, e.g., part of a touch-screen interface. A user of the radio device enters inputs by way of the touch screen interface, such as by marking of selections available on the screen display. Upon completion of the markings, such as by marking an enter or OK icon, the selections are entered, and the entered selections are used to form a schedule.

In another aspect of the present invention, two or more schedules are created. For instance, a first schedule defines a week day schedule, and a second schedule defines a weekend schedule. Additional schedules and schedules for use during other defined periods are also formable.

In another aspect of the present invention, a message detector is provided to detect delivery at the radio device of a message, such as a text message or multimedia message. The detector, in one embodiment, further detects characteristics of the message, such as its origin, i.e., the identify of its sender, its content, such as by analysis of its subject line, etc. If determined to be of a message type appropriate for annunciation, the message is provided for further analysis.

In another aspect of the present invention, the detected message is compared together with the schedule to determine in what manner to annunciate the detected message. In the event that multiple schedules are utilized, a determination is first made of the schedule that is to be utilized. For instance, if the schedules are day of week schedules, the schedule pertaining to the day at which the message is detected is retrieved. The schedules are maintained, for instance, at a memory element of the radio device. The schedule is utilized to ascertain in what manner to annunciate the delivery of the message at the radio device.

In another aspect of the present invention, the schedule further includes settings that are determinative of the manner in which the message delivery is annunciated. The annunciation provides a repeat notification, that is to say, an annunciation that repeats in some manner. The settings identify, for instance, the magnitude of the annunciation, such as the loudness of an aural annunciation, or amount of vibrations of a vibratory annunciation, or other magnitude indicia. And, the settings further, for instance, identify the type of annunciation, i.e., aural, visual, vibratory, etc. And, the settings further identify time periods separating the successive annunciations. And, the settings further include, for instance, an indication of the number of repetitions of annunciations to alert the delivery of the message.

Because the delivery of the message is annunciated repeatedly, that is to say, the notification of its delivery is repeated, the user of the radio device is more likely to notice the received message. The user is thereby more likely timely to ascertain the informational content of the communicated message and to be able to more quickly to take action in response thereto.

In these and other aspects, therefore, an apparatus, and an associated method, is provided for a radio device that receives a notification message. A storage element is configured to store at least a first notification schedule. The first notification schedule has entries including a first scheduled time and a first repeat notification rule set. A comparator is configured to compare indicia of the notification message received at the radio device with the entries of the first notification schedule. An annunciator is configured selectably to annunciate reception of the notification message in conformity with the entries of the first notification schedule in response to comparison made by the comparator.

A more complete appreciation of the scope of the present invention and the manner in which it achieves the above-noted and other improvements can be obtained by reference to the following detailed description of presently preferred embodiments taken in connection with the accompanying drawings which are briefly summarized below, and by reference to the appended claims.

DETAILED DESCRIPTION

Figure 1:
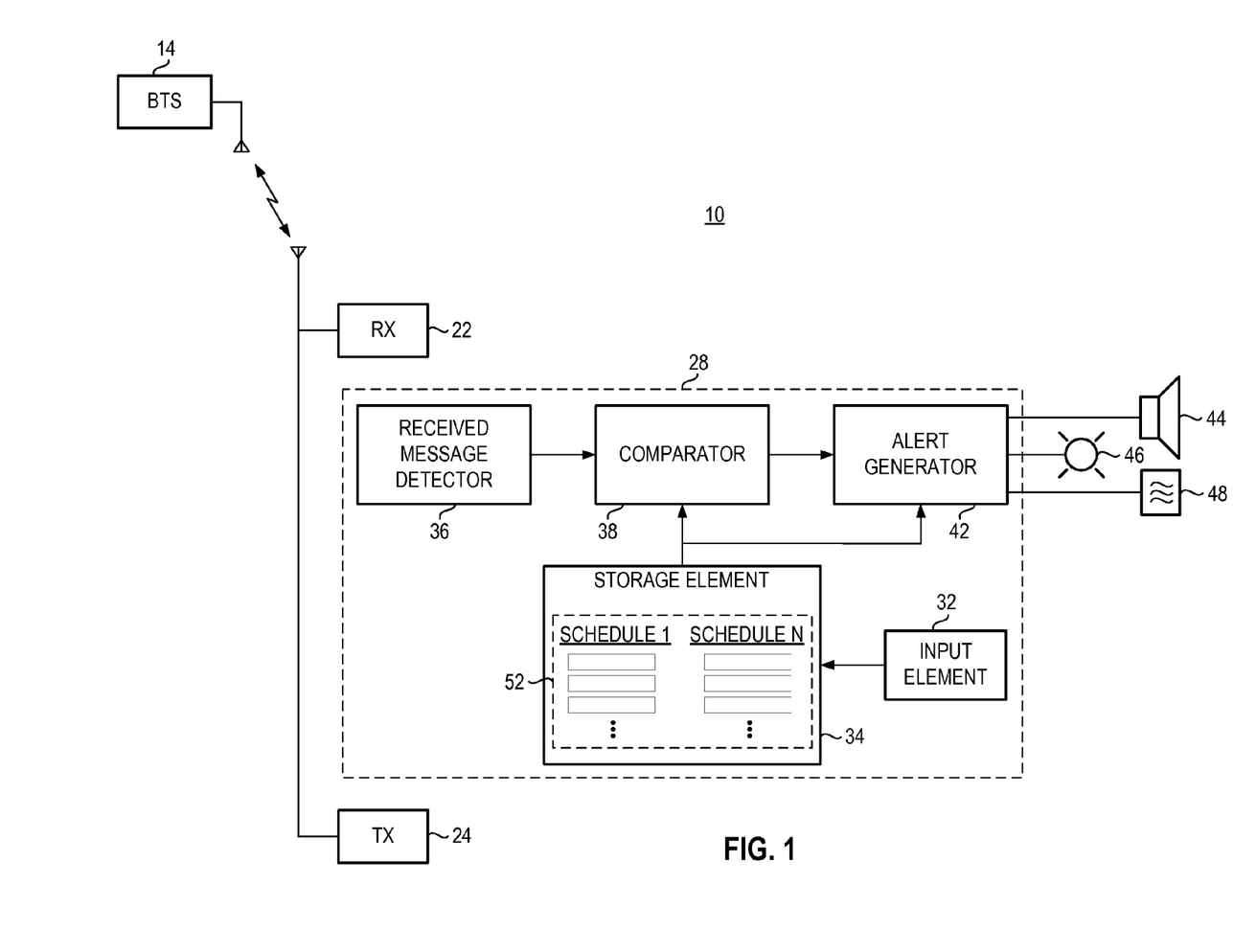
FIG. 1 illustrates a functional block diagram of a portable radio communication device at which an embodiment of the present invention is operable.

FIG. 1 illustrates a radio communication system, shown generally at 10, that provides for message communication services with portable radio devices, of which the radio device 12 is representative. The communication system 10, in the exemplary implementation, comprises a cellular communication system that provides for data services, at least text messaging services. And, in the exemplary implementation, the device 12 forms a Windows™ based mobile device-compliant device, such as a Cingular™ 8125™ email device. More generally, the device 12 is representative of a radio device capable of receiving and using a message.

Here, the message is sent by a base transceiver station (BTS) 14, upon a radio air interface 16 and delivered to the radio communication device. The radio communication device includes transceiver circuitry, represented by a receiver (RX) 22 and a transmitter (TX) 24. The radio device also includes apparatus 28 of an embodiment of the present invention. The apparatus 28 is functionally represented, formed of functional entities, implementable in any desired manner. The entities, or portions thereof, are implemented in any desired manner, including, for instance, algorithms executable by processing circuitry, hardware implementations, or combinations thereof. Here, the apparatus includes an input element 32, a storage element 34, a received message detector 36, a comparator 38, and an alert generator 42. The alert generator drives transducers, here an acoustic transducer 44, e.g., a speaker, a light transducer, i.e., a light, and a physical transducer 48, e.g., a vibrator.

The storage element receives input information input by the input element 32, such as an interactive display device, keyboard, or the like. A user of the portable radio device inputs information by way of the input element. The input information includes, e.g., a schedule of alert generation to be performed when a text, or other, message is delivered to the radio device. The schedule is user-made. A single schedule is selectable for multiple schedules, depending upon the time-of-day and day-of-week, or any other temporal indicia. And, different schedules are creatable for different types of messages, e.g., messages originated by different originating parties or messages having different types of content. In the exemplary implementation, the input element comprises a touch screen interface. A user is provided with selections on a screen display. The user selections, entered by way of the touch screen. A list is formed, here indicated at 52, of the schedule entry, or entries, once input by way of the input element.

When a message is received at the transceiver circuitry of the radio device, the received message detector detects its delivery. And, parts of the message, such as its originator or its content, is provided to the comparator 38. The comparator compares the detected information with values accessed from the list 52. The temporal, or other, information contained in the listing schedule is also used by the comparator. Comparison made by the comparator provides indication of the alerts, and the manner of alerting, that should be used. The indications are provided to the alert generator, and the alert generator causes the appropriate transducers to operate in responsive manner. By the operation of the apparatus, i.e., the tool of an embodiment of the present invention, desired notification of incoming email is provided. Repeat notification, if desired, is provided in a desired combination of audible, visible and vibratory functions. The tool, in the exemplary implementation, is configured to work in conjunction with Windows Exchange™ server-side rules to control which messages are directed to the in box that triggers email notification.

In one exemplary scenario, the user of the device elects only to receive notification of high priority messages and messages originated from a paging device. A customizable notification schedule is built and stored at the storage element to allow the user to designate different modes of notification depending upon temporal information, e.g., the day of the week and peak or off-peak hours. Repeat notification, pager functionality and notification schedules are all provided. Existing mechanisms, such as pocket PC notification software, e.g., phone alarm™ do not provide for this type of functionality.

In another implementation, multiple notification schedules are provided. Each schedule is customized, e.g., with peak hour settings, day of the week settings, audible tone and/tone vibratory options. In a further implementation, tone volume control, with an optional override of the default device volume is provided. Additionally, the frequency and duration of notification is provided. And, an optional disable is provided in the event of battery power supply levels falling to a predefined level. In a further implementation, a load-at-startup setting is provided to provide automatic notification even after a hard or soft reset of the device. Audible tone selection is provided, and application is provided in a Cab format. Selection is made, e.g.., to provide automatic message light blinking upon delivery of a new message or to alert existence of an unread message.

Figure 2:
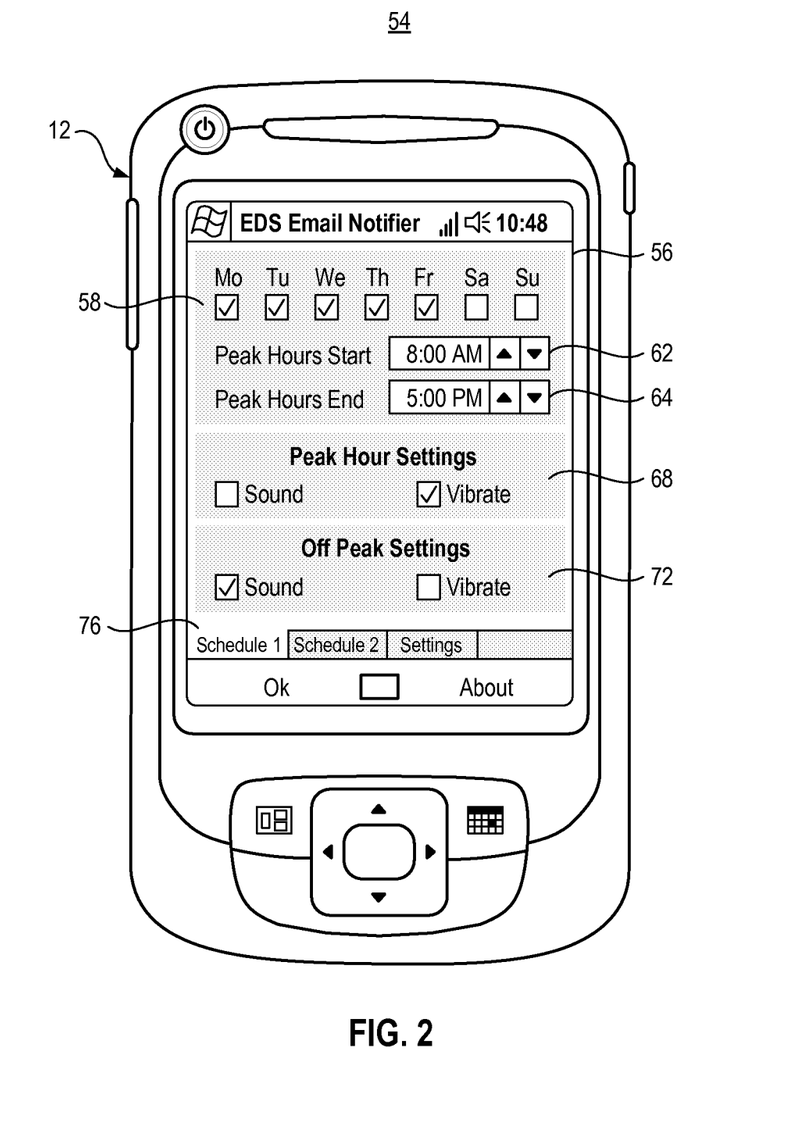
FIG. 2 illustrates an exemplary screen display generated pursuant to exemplary operation of an embodiment of the present invention.

FIG. 2 illustrates a representation of an exemplary screen display 54 that is displayable at a display screen of a touch screen interface forming the input element 32, shown in FIG. 1 of an embodiment of the present invention. The screen display 54 here shows a schedule template 56 subsequent to schedule selection by a user of the radio device. The schedule template provides for selection of days of the week 58 of which any combination of all seven days are selectable. In the exemplary example shown in FIG. 2, the user selects the five week days, Monday-Friday, and boxes associated with the five days are checked with the check marks. The schedule template further includes a peak hour start and end indications 62 and 64 that, in the exemplary illustration, are defined by the user to extend between 8 a.m. and 5 p.m. The annunciation-type during the peak hours is selectable at the field 68 at which, here, the user selects a vibratory mode during the peak hours. The field 72 provides for the selection of off-peak settings. Here, the user selects sound annunciation as the non-peak alert mode. Upon completion of entry of the user selections, the user finalizes the selection through actuation of the OK key 74. As indicated by the "schedule 1" icon 76, the screen display defines a first schedule of a plurality of schedules.

Figure 3:
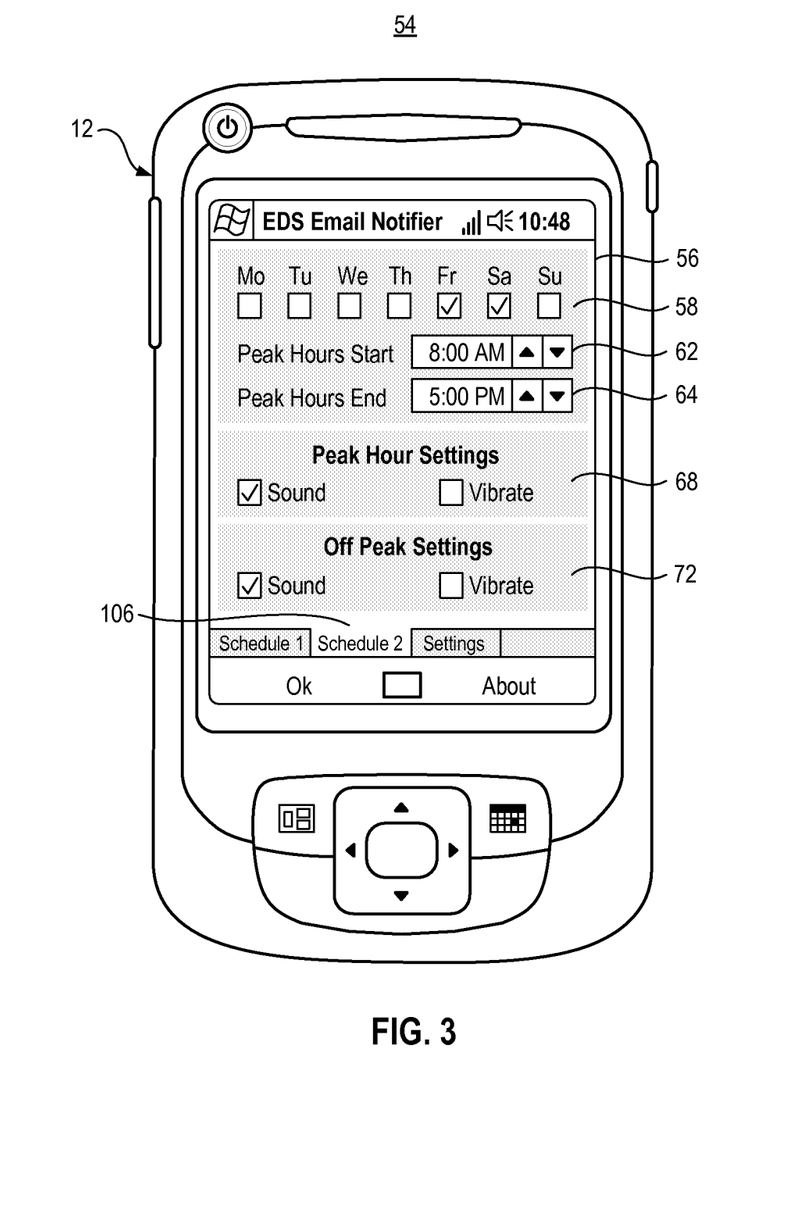
FIG. 3 illustrates a view, similar to that shown in FIG. 2, but of a further display, also representative of an embodiment of the present invention.

FIG. 3 illustrates a screen display 104 that is also displayable at a touch screen interface. The display screen 104 contains the schedule template 56 that is identical to the like-numbered template 56 shown in FIG. 2. The schedule template again shows a day of week field 58, peak hour start and end selections 62 and 64, and settings fields 68 and 72. Here, the display screen defines a second schedule, indicated by the icon 106. Here, selection made by a user of the radio device indicates weekend schedule settings, i.e., the user has selected Saturday and Sunday for the second schedule, as indicated by the checkmarks in blocks associated with the Saturday and Sunday indications. Selection is made at the peak start and end times of 8 a.m. to 5 p.m. as the peak hours. At the field 68, the user selects sound during the peak hours and as indicated by the field 72, the user selects sound during off peak hours.

The operation of the tool solves the problem of repeat notification on Windows mobile devices by providing multiple custom schedules and repeat notification custom settings. The tool monitors the Exchange in-box. When new messages are detected, the tool notifies the user according to the schedule constraints with sound and/or vibrations. The user controls which messages receive notification by configuring their Exchange rules to deliver only messages that the user wishes to have immediate notification to the in box. Messages not requiring immediate notification are delivered to a separate folder for normal priority items.

Figure 4:
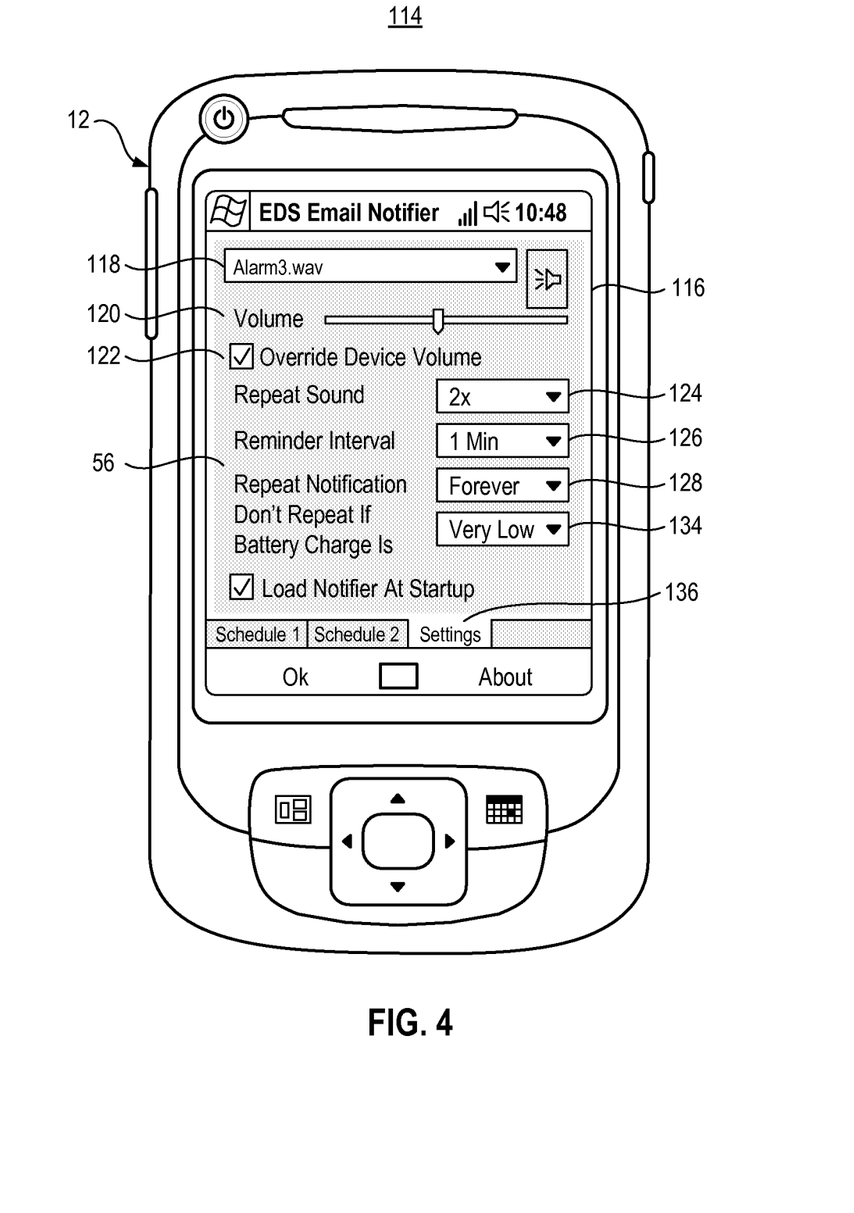
FIG. 4 illustrates a view, similar to those in FIGS. 2-3, but of a display generated pursuant to additional operation of an embodiment of the present invention.

FIG. 4 illustrates a screen display 114 that provides for the selection of annunciation settings. The screen display 114 permits user selection of what sounds and volume levels should be used to make notification of the delivery of the message as well as the number of times that the notification is repeated. Further settings include a notification interval, how long repeat notifications should continue, and what to do in the event that a battery level exceeds a certain threshold. In one implementation, the user is permitted to choose not to load the tool at device start up and, instead, use available resources for other applications.

The screen display includes a settings template 116 having a plurality of fields providing for selection by a user of the radio device of the annunciation characteristics. A field 118 provides for selection of an annunciation sound. Here, an alarm 3. WAV alarm is selected. The field 120 provides for a volume selection. Here, the user selects a volume level midway between a low and a high volume level. A device volume override field 122 is further selectable. Here, the user selects the override, and a checkmark is placed in the box associated with the override device volume field.

A repeat sound field 124 provides for selection of the increase in the magnitude of the sound level upon a notification repeat. Here, the repeat sound is selected to be at a 2× increase. The field 126 permits selection of intervals between reminders. Here, one minute intervals are selected by the user. The field 128 provides for selection of whether to generate repeat notifications in the event that the battery power levels at the radio device are low. Here, selection is made by the user not to repeat the notifications in the event that the battery charge level is very low. A field 132 provides for load notification at start up. And, the icon 134 indicates the screen display to be a settings template.

Figure 5:
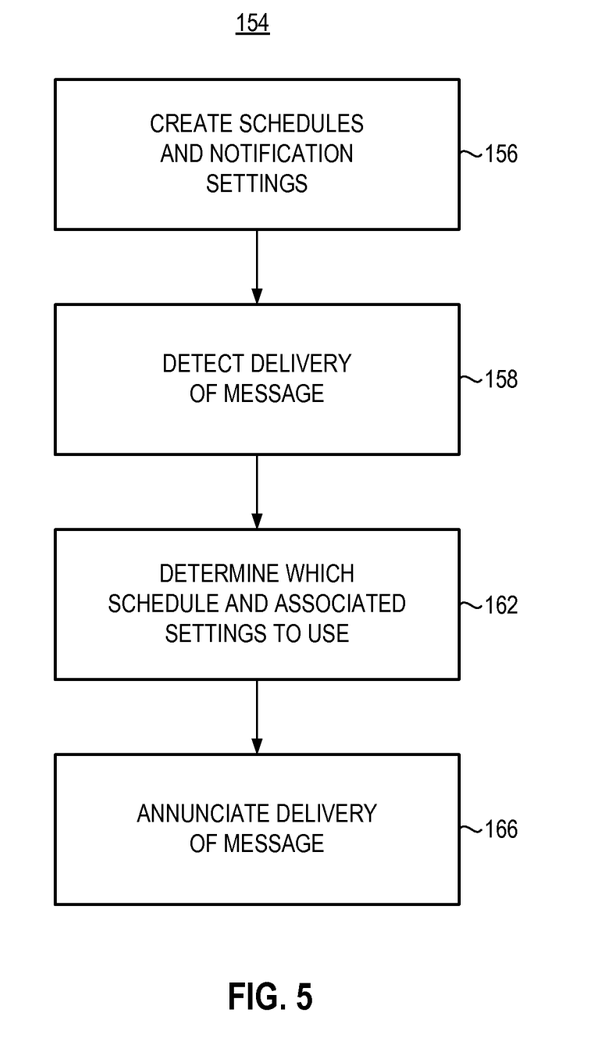
FIG. 5 illustrates a process diagram representative of the process of operation of an embodiment of the present invention.

FIG. 5 illustrates a process, shown generally at 154, representative of the process of operation of an embodiment of the present invention. First, and as indicated by the block 156, the user creates schedules that provide for repeat notifications to notify the user upon delivery of a message to a radio device. The schedules comprise, for instance, schedules corresponding, or analogous, to those shown in FIGS. 2 and 3. Settings for the annunciations are also made, such as by way of an interface analogous to that shown in FIG. 4.

Subsequently, and as indicated by the block 158, in the event that a message is delivered to the radio device, the message is detected. Then, and as indicated by the block 162, a determination is made of which schedule is to be utilized an annunciation settings defined therein to annunciate delivery of the message. The determination is made, for instance, through comparison of characteristics of the receive message, such as its time and date of arrival and its origin. Then, and as indicated by the block 166, annunciation of the detected message is made. The annunciation is made in conformity with the settings and schedule that had been created and determined to be used to make the annunciation.

Because repeat notifications of a detected message are made, the user is less likely to miss a received message. The user is more likely expeditiously to take action in response to the received message.

In the exemplary implementation, the application is designed using visual studio 2005 C# and consists of a ppcnotify.exe application. This application forms a user interface that allows the user to configure the notification features. A ppcnotifieservice.exe application is also provided. This application forms the service that monitors incoming and unread messages. And, a ppcrunapp.exe application is further provided. In this application, physical notification is provided based upon notification settings.

Thereby, an improved manner is provided by which to alert a user of a terminating message received at the radio device. Repeat notification is provided according to a user-input schedule.

What is claimed is:

1. An apparatus for a radio device that receives a notification message, said apparatus comprising:
   a storage element in a radio device configured to store at least a first notification schedule having entries including a first schedule time and a first aspect notification rule set, wherein said storage element is further configured to store a repeat notification rule set and to store a battery charge level setting;
   a comparator to compare indicia of the notification message received from a base transceiver station at the radio device with the entries of the first notification schedule, wherein the indicia comprise information content parts of the notification message other than origin of the message; and
   an annunciator to selectably annunciate reception of the notification message in conformity with the entries of the first notification schedule in response to comparison made by said comparator, wherein the annunciator is further configured to repeatably annunciate reception of the notification message according to the repeat notification rule set when a battery level is above the battery charge level setting and to not annunciate reception of the notification message when the battery level is below the battery charge level setting;
   wherein the entry of the first schedule time comprises:
   a first peak schedule time period; and
   a first non-peak schedule time period to at least partially enable the selectable annunciation of the notification message by the annunciator.

2. The apparatus of claim 1 wherein said storage element is further configured to store a second notification schedule having entries including a schedule time and a repeat notification rule set.

3. The apparatus of claim 2 wherein said comparator is further configured to compare the indicia of the notification message with the entries of the second notification schedule.

4. The apparatus of claim 3 wherein said annunciator further compares the indicia of the notification message with the entries of the second notification schedule.

5. The apparatus of claim 1 further comprising a user actuator to permit actuation thereof to enter the entries of the at least the first notification schedule.

6. The apparatus of claim 1 wherein the entry of the first schedule time of the first notification schedule comprises a day-of-week entry.

7. The apparatus of claim 1 wherein the entry of the first schedule time of the first notification schedule comprises a time-of-day entry.

8. The apparatus of claim 1 wherein a first repeat notification rule set comprises a rule defining a first annunciation and a second annunciation to repeatedly annunciate delivery of the notification message.

9. The apparatus of claim 8 wherein the first repeat notification rule set further comprises a time period identifying a pause period between the first annunciation and the second annunciation.

10. The apparatus of claim 8 wherein the first annunciation is of a first annunciation type and the second annunciation is of a second annunciation type.

11. The apparatus of claim 1 wherein the entry of the a first peak schedule time period and the first non-peak schedule time period is entered by a user of the radio device.

12. The apparatus of claim 11 wherein a first repeat notification rule set comprises a first peak schedule notification rule and a first non-peak schedule notification rule.

13. The apparatus of claim 11 wherein the peak notification rule set further identifies a volume level of an aural annunciation.

14. The apparatus of claim 11 wherein the peak notification rule set further comprises a rule defining a plurality of times to annunciate the delivery of the notification message.

15. A method for facilitating annunciation of reception of a notification message at a radio device, said method comprising:
   receiving a characteristic of the notification message with entries of at least a first notification schedule that includes a schedule time and a first repeat notification rule set, wherein the first repeat notification rule set comprises a rule defining a plurality of times to annunciate the delivery of the notification message in a radio device and with at least one entry of a repeat notification rule set and to store a battery charge level setting and
   selectably annunciating reception of the notification message in conformity with the entries of the first notification schedule in response to comparison made during said comparing of the characteristic of the notification message, wherein selectably annunciating comprises repeatably annunciating reception of the notification message according to the repeat notification rule set when a battery level is above the battery charge level setting and to not annunciate reception of the notification message when the battery level is below the battery charge level setting;
   storing a rule set in the radio device that comprises;
   a first peak schedule time period; and
   a first non-peak schedule time period to at least partially enable the selectable annunciation of the notification message.

16. The method of claim 15 further comprising detecting reception at the radio device of the notification message.

17. The method of claim 15 wherein said comparing further comprises comparing a characteristic of the notification message with entries of a second notification schedule that includes a schedule time and a second repeat notification.

18. The method of claim 17 wherein said selectably annunciating further comprises selectably annunciating reception of the notification message in conformity with the entries of the second notification schedule in response to comparison made during said comparing of the characteristic of the notification message.

19. The method of claim 15 further comprising selecting the entries of the at least the first notification schedule.

\* \* \* \* \*